United States Patent [19]
Chau et al.

[11] Patent Number: 6,001,477
[45] Date of Patent: Dec. 14, 1999

[54] PHOSPHOR POWDER FOR COATING LAMP ENVELOPES AND METHOD FOR PREPARATION

[75] Inventors: Chung Nin Chau, Sayne, Pa.; Tracy V. Silloway, Hampton; Paul W. Salvi, Danville, both of N.H.

[73] Assignee: Osram Sylvania Inc., Danvers, Mass.

[21] Appl. No.: 08/775,983

[22] Filed: Jan. 3, 1997

[51] Int. Cl.$^6$ ............................. B32B 5/16; B05D 7/22; B05D 5/06
[52] U.S. Cl. ............................. 428/407; 427/64; 427/66; 427/67; 427/214; 427/215; 427/217; 427/221; 427/226; 427/372.2
[58] Field of Search ............................. 428/407; 427/215, 427/64, 66, 67, 226, 372.2, 214, 217, 221

[56] References Cited

U.S. PATENT DOCUMENTS

| | | | |
|---|---|---|---|
| 4,265,950 | 5/1981 | Graff | 428/35 |
| 4,340,512 | 7/1982 | Schreurs | 523/122 |
| 4,710,674 | 12/1987 | Sigai | 313/489 |
| 5,113,118 | 5/1992 | Sigai et al. | 313/486 |
| 5,196,229 | 3/1993 | Chau | 427/66 |
| 5,382,452 | 1/1995 | Bruno et al. | 427/215 |
| 5,417,886 | 5/1995 | Tateiwa et al. | 252/301.4 R |
| 5,433,888 | 7/1995 | Okada et al. | 252/301.4 |
| 5,695,685 | 12/1997 | Chau et al. | 252/301.4 R |

FOREIGN PATENT DOCUMENTS

| | | |
|---|---|---|
| 0479298A1 | 8/1992 | European Pat. Off. . |
| 0479300A1 | 8/1992 | European Pat. Off. . |
| 479 300 A1 | 8/1992 | European Pat. Off. ........ C09K 11/02 |
| 40-76450 | 3/1970 | Japan . |
| WO 96/05265 | 2/1996 | WIPO ............................. C09K 11/02 |

*Primary Examiner*—Chris Eisenchenk
*Assistant Examiner*—Mary K Zeman
*Attorney, Agent, or Firm*—Robert F. Clark

[57] ABSTRACT

A method for providing an adherent, continuous, conformal, non-particulate coating of a compound of a metal or metalloid on the surface of individual phosphor particles. The method involves wetting each of the individual particles with a polymer solution including a polymer in a solvent base, the polymer being capable of chelating ions of the metal or metalloid. The particles then are dried to produce a continuous coating of the polymer on each of the individual particles. The polymer-coated phosphor particles are suspended in a solution containing ions of the metal or metalloid and having a pH of at least 9 to produce chelation of the metal or metalloid ions by the polymer coating, to produce the adherent, continuous, conformal, non-particulate, metal- or metalloid-compound coating on the particle surfaces. Also described are a method for improving lumen maintenance of a lamp, a coated phosphor powder, and a phosphor-coating composition for coating an inner surface of a lamp envelope.

12 Claims, No Drawings

PHOSPHOR POWDER FOR COATING LAMP ENVELOPES AND METHOD FOR PREPARATION

CROSS-REFERENCE TO RELATED APPLICATIONS

The present application contains subject matter related to U.S. Pat. No. 5,695,685, issued Dec. 9, 1997, commonly assigned and filed concurrently herewith. U.S. Pat. No. 5,695,685, issued Dec. 9, 1997 is incorporated herein by reference.

BACKGROUND OF THE INVENTION

The present invention relates to lamp phosphors, and particularly to coated phosphor powders exhibiting increased lumen maintenance when used in such lamps, as well as coating methods therefor.

Fluorescent lamps are known to experience a gradual decrease in brightness with extended operation of the lamp. There are several factors contributing to this low lumen maintenance including deposits of impurities from the lamp cathode onto the lamp envelope, the formation of various mercury compounds due to the bombardment of the phosphor by atoms and ions of the mercury included in the envelope, changes in the phosphor itself through inter- or intra-atomic reactions, and changes in the glass of the envelope, e.g., due to exposure to ultraviolet radiation. One of the chief causes of low lumen maintenance is the deposition of mercury compounds on the surface of the phosphor coating the interior surface of the lamp envelope. Such deposition is particularly deleterious in such lower cost, low maintenance phosphors such as zinc orthosilicate (synthetic willemite) phosphors.

Attempts have been made to coat phosphor particles with, e.g., a coating of an inert material such as alumina or other oxide, before their use in the lamp making process, to improve lumen maintenance in the lamp. It is particularly important that such a coating be highly conformal, since a conformal coating provides continuous coverage of each phosphor particle, shielding the phosphor from, e.g., chemical attack during lamp processing and operation. However, some of these coating attempts have resulted in poor adherence of the coating to the phosphor, or in non-conformality of the coating to the phosphor particle after, or even before bake-out of the lamp. Also, solid state diffusion of the oxide components into the bulk phosphor material at high temperatures can generate a new phase boundary between the oxide layer and the phosphor substrate. Undesirable phases can result, e.g., a phase having a high concentration of dislocations or defects in its crystal structure. Such excess dislocations or defects can act as energy traps for the phosphor under certain conditions of solid state diffusion thermodynamics, lowering the lumen output of the phosphor and defeating the purpose of the coating.

Further, many prior art processes for applying the oxide coatings to the phosphor particles involve suspending the phosphor powder in a fluidized bed for MOCVD (metal organic chemical vapor deposition) of the coating. This MOCVD process requires the use of a fluidized bed reactor, elaborate instrumentation, careful air flow and temperature monitoring, and separating out of a very narrow phosphor particle size range for successful suspension of the powder in the fluidized bed. In most of these processes, the oxide coating is deposited on a fully fired phosphor substrate, requiring an extra process step to apply the coating and increasing the cost of the phosphor fabrication process.

Non-CVD processes for applying protective coatings to phosphor particles using colloidal silica or precipitation of barium phosphate provide cost effective protection of the phosphor particles. These processes, however, provide only physically adsorbed coatings which require careful monitoring of the process to prevent spotty or non-conformal coatings.

The coating of individual phosphor particles with organometallic compounds, i.e., metal alkoxides, and converting the alkoxides to protective metal compounds during lamp burn-out is described in U.S. Pat. No. 5,196,229 to Chung N. Chau, one of inventors of the present invention. U.S. Pat. No. 5,196,229 is incorporated by reference herein. This method produces continuous, non-particulate, conformal, chemically adherent coatings on phosphors, and results in improved lumen maintenance in lamps in which the coated phosphor is used. However, the method is restricted in its use by the limited choice of precursor materials.

Accordingly, it is an object of the present invention to provide a phosphor and a phosphor coating method which overcome the disadvantages of the prior art.

It is yet another object of the invention to provide a phosphor with improved maintenance properties.

It is still another object of the invention to provide a coated phosphor exhibiting modified surface properties.

It is a further object of the invention to provide a coated phosphor exhibiting improved coating adherence, continuity, and conformality in the powder and in the finished lamp.

It is yet a further object of the invention to provide a reliable, cost effective chemical adsorption process for production of a coated phosphor exhibiting improved maintenance properties.

SUMMARY OF THE INVENTION

In accordance with these objects, in one aspect the invention is a method for providing an adherent, continuous, conformal, non-particulate coating of a compound of a metal or metalloid on the surface of individual phosphor particles. The method involves wetting each of the individual particles with a polymer solution including a polymer in a solvent base, the polymer being capable of chelating ions of the metal or metalloid. The particles then are dried to produce a continuous coating of the polymer on each of the individual particles. The polymer-coated phosphor particles are suspended in a solution containing ions of the metal or metalloid and having a pH of at least 9 to produce chelation of the metal or metalloid ions by the polymer coating, to produce the adherent, continuous, conformal, non-particulate, metal- or metalloid-compound coating on the particle surfaces. Preferably, the pH of the polymer solution is at least 9.

In another aspect, the invention is a method for improving lumen maintenance of a lamp. The method involves producing by the method described above a phosphor powder having an adherent, continuous, conformal, non-particulate, metal- or metalloid-compound coating on the particle surfaces. The metal- or metalloid-compound coated particles then are suspended in a solution including a binder and an aqueous medium to form a phosphor suspension. An interior surface of a lamp envelope is then coated with a layer of the phosphor suspension. The phosphor layer is dried sufficiently to adhere the phosphor layer to the lamp envelope surface. The lamp envelope then is lehred to burn out the binder and the polymer and to produce a coating on the lamp envelope of phosphor particles, each particle having an adherent, continuous, conformal, non-particulate, metal- or metalloid-compound coating on its surface.

In yet another aspect, the invention is a coated phosphor powder including individual particles of a phosphor, each of the particles being coated with an adherent, continuous, conformal coating including a polymer and a chelate of a metal or metalloid and the polymer.

In still another aspect, the invention is a phosphor coating composition for coating an inner surface of a lamp envelope. The composition includes a suspension of the above-described chelate-coated phosphor in a solution comprising a binder and an aqueous medium.

DETAILED DESCRIPTION OF THE PREFERRED EMBODIMENTS

In one exemplary embodiment, a phosphor is coated with a coating of a metal compound by a reaction between a metal and a polymer capable of chelating ions of the metal. As used herein, the term "metal" is intended to mean a metal or a metalloid such as silicon or boron. For example, in the case of a zinc silicate phosphor, the polymer may be provided by PVM/MA (polyvinyl methylether/maleic anhydride), while the metal may be a barium ion provided by barium phosphate. The reaction takes place directly on the surface of each individual phosphor particle. The resulting Ba-PVM/MA coating is chemically adhered to the particles of the phosphor powder. The phosphor exhibits improved adherence, conformality, and continuity and provides improved lumen maintenance when applied to the interior surface of a lamp envelope.

The process involves chelation of ions of the desired metal by a polymer having carboxylic or ketonic functional groups. A chelating polymer is deposited directly onto the surfaces of the phosphor particles. The polymer deposition may be effected by suspending the phosphor powder in a solution containing the polymer in a liquid medium. In the suspension, the polymer adheres to the surface of each phosphor particle. The phosphor particles are then separated from the polymer solution, e.g., by filtering. It has been found that the polymer deposited by this process is chemically adsorbed onto the surface of the polymer. This method provides a continuous, conformal, non-particulate polymer coating on the phosphor particles.

The metal ions then are exposed to the polymer coating by resuspending the polymer-coated phosphor particles in a liquid medium. A salt of the desired metal is dissolved in the liquid medium either before or after suspension of the phosphor particles therein, providing the desired metal ions. The polymer coating on the phosphor particles acts as a chelating agent, sequestering the metal ions. The chelation of the metal ions results in a high concentration of the metal ions at the surfaces of the phosphor particles and a chemical link between the surface of each phosphor particle and the metal ions via the chemically adsorbed polymer. Both suspensions typically are water-based, but any solvent media which will dissolve the polymer and the metal salt but be relatively unreactive with the phosphor particles may be used.

For use in a lamp, the treated phosphor typically is suspended in an aqueous solution including a binder and an adherence-enhancing compound, and applied to the lamp envelope interior surface. The coated lamp envelope is then heated to remove the binder using any binder burn-out process well known in the art. The burn-out process also causes the polymer coating on the phosphor particles to decompose leaving an inorganic residue which includes the metal ions. Thus, in the lamp coating, the metal ions are chemically adsorbed onto the particle surfaces via the inorganic residue. The inorganic residue induces crystal growth at the phosphor surface, resulting in a continuous, conformal surface coating of a metal compound which is highly adherent to the lamp envelope. The continuous, adherent coating provides improved protection for the phosphor from deposited mercury and mercury compounds, resulting in improved lumen maintenance for the lamp.

Similar chelation reaction mechanisms may be used to coat other phosphors with metal compounds. For example, the phosphor may be a Cool White calcium halophosphate, barium disilicate, or willemite phosphor. Also alternatively, the polymer may be, e.g., a polyethylene oxide or hydroxyethyl cellulose polymer, and the metal ion may be, e.g., a barium, lanthanum, strontium, magnesium, calcium, aluminum, yttrium, or zinc ion provided by any metal salt that is soluble in the liquid medium and will not interfere with the chelation reaction. The metal ion may also be an ion of a metalloid such as silicon or boron, provided by a metalloid salt such as silicic acid, tetraethoxysilane, boric acid, or lithium tetraborate. Typical combinations of these components include Cool White calcium halophosphate phosphor, polyethylene oxide polymer, and a barium salt (e.g., barium nitrate); and calcium halophosphate phosphor, PVM/MA, and a lanthanum salt.

The following Examples are presented to enable those skilled in the art to more clearly understand and practice the present invention. These Examples should not be considered as a limitation upon the scope of the present invention, but merely as being illustrative and representative thereof.

EXAMPLE 1

Polymer Coating:

Six 300 g samples of Cool White calcium halophosphate phosphor were milled for 1 hour with 120 g deionized water and the equivalent of 0.6 g PVM/MA, added as predissolved PVM/MA, 5% in water. The pH for some of the sample mixtures was adjusted with $NH_4OH$ to a pH greater than 9. Some of the sample mixtures also contained Dispex (Alloid Colloids Inc., Suffolk, Va.) as a dispersing agent. The treatments given the various milled suspensions are shown in Table I. Some of the samples were filtered, washed with deionized water, refiltered, and dried before testing, while others were only filtered and dried.

TABLE I

| Sample | pH adj. | Dispex | Water Wash |
| --- | --- | --- | --- |
| 1 | no | no | no |
| 2 | no | no | yes |
| 3 | 9+ | no | no |
| 4 | 9+ | no | yes |
| 5 | 9+ | yes | no |
| 6 | 9+ | yes | yes |

Samples 1–6 and control Sample 7 of virgin Cool White phosphor were tested by ESCA (electron spectroscopy for chemical analysis) to determine the atomic composition at the surface of the phosphor particles. The results are shown in Table II. The analysis showed evidence of both the CH and the CO carbon species at the surface of Samples 1–6. Samples 1–6 were also tested by SNMS (sputtered neutrals mass spectrometry) profiling to determine the composition of the phosphor particles at various depths from the surface. The results showed evidence of the organic component in the form of conformal polymer coatings concentrated at the surfaces of the phosphor particles. A control sample, Sample 7, of virgin Cool White calcium halophosphate phosphor showed no such evidence.

TABLE II

| Sample: | 1 | 2 | 3 | 4 | 5 | 6 | 7* |
|---|---|---|---|---|---|---|---|
| C: | 16 | 15 | 16 | 16 | 27 | 12 | 11 |
| Al: | 0 | 0 | 0 | 0 | 0 | 0 | 0 |
| Na: | 0 | 0 | 0 | 0.3 | 0 | 0.4 | 0 |
| Ba: | 0 | 0 | 0 | 0 | 0 | 0 | 0 |
| O: | 54 | 55 | 55 | 54 | 48 | 57 | 58 |
| Mn: | 0.6 | 0.5 | 0.4 | 0.5 | 0.3 | 0.4 | 0.5 |
| P: | 10 | 11 | 10 | 10 | 8.7 | 11 | 11 |
| Cl: | 0 | 0.1 | 0 | 0.1 | 0.1 | 0.1 | 0.1 |
| F: | 3.5 | 3.5 | 3.2 | 3.1 | 2.4 | 3.3 | 3.6 |
| Ca: | 15 | 16 | 15 | 16 | 13 | 16 | 16 |

*Control sample, virgin Cool White phosphor

EXAMPLE 2

Step 1—Polymer Coating:

Seven samples, Samples 8–13, of Cool White calcium halophosphate phosphor were coated with PVM/MA in a manner similar to that described for Example 1. For each sample, 300 g of phosphor was milled for 1 hour with 120 g water and 0.6 g PVM/MA (in the form of predissolved PVM/MA, 5% in water). Some of the sample mixtures also contained Dispex as a dispersing agent. Additionally, 1.0 weight percent (based on the weight of the phosphor) $BaHPO_4$ was added to Sample 13 before milling. Two other samples, Samples 14 and 15, were milled with 1.0 weight percent $BaHPO_4$ (again, based on the weight of the phosphor), but without PVM/MA. The pH for some of Samples 8–15 was adjusted with $NH_4OH$ to achieve a pH greater than 9. Before testing, milled Samples 8 and 10 were centrifuged, decanted, suspended in water, filtered, and dried, while the others were simply filtered and dried. The treatments given the various milled mixtures are shown in Table III.

Step 2—Metal Chelation:

Samples 8–12, 14, and 15 were resuspended in water and further treated. $BaHPO_4$ in an amount of 1.0 weight percent was added to Samples 8–12, and Samples 9–12, 14, and 15 were adjusted to a pH of greater than 9 by the addition of $NH_4OH$. In Sample 11, the pH adjustment was effected after the barium ion addition; in Sample 12, before the barium ion addition. The additions to the resuspended samples are also shown in Table III.

Samples 8–15 were tested, Sample 13 after milling and the remaining samples after resuspension treatment, by ESCA to determine the atomic composition at the surface of the phosphor particles. The results are shown in Table IV. The samples were also tested by SNMS to determine the composition of the phosphor particles at various depths from the surface.

Tables III and IV illustrate that generally higher barium ion concentrations are present at the surface of the phosphors coated with a PVM/MA before exposure to the barium ion (Samples 8–12) than at the surface of those not so pre-coated (Samples 13–15), indicating that the presence of the organic pre-coat aids in deposition of the barium onto the surface of the phosphor particles. Tables III and IV also show that the organic pre-coated samples prepared at higher pH levels (Samples 9, 11, and 12) have higher barium ion concentrations at the phosphor surface than that with lower pH (Sample 13), while the addition of the dispersing agent, Dispex, appeared to interfere with the deposition reaction (Sample 10). Additionally, these tables show that the organic pre-coat was strongly bonded to the particle surfaces, even after washing with (resuspension in) water and other subsequent treatment, as shown by the high carbon content of the samples (particularly Sample 10, unwashed, and Samples 11 and 12, washed).

TABLE III

| | Step 1 — Milled Phosphor | | | | Step 2 — Resuspended Phosphor | |
|---|---|---|---|---|---|---|
| Sample | PVM/MA | pH adj. | Dspx | $BaHPO_4$ | pH adj. | $BaHPO_4$ |
| 8 | yes | no | no | no | no | 1.0% |
| 9 | yes | 9+ | no | no | 9+ | 1.0% |
| 10 | yes | 9+ | yes | no | 9+ | 1.0% |
| 11 | yes | no | no | no | 9+ | 1.0% |
| 12 | yes | no | no | no | 9+ | 1.0% |
| 13 | yes | no | no | 1.0% | — | — |
| 14 | no | no | no | 1.0% | 9+ | no |
| 15 | no | 9+ | no | 1.0% | 9+ | no |

TABLE IV

| Sample | C | Na | Ba | O | Mn | P | F | Ca |
|---|---|---|---|---|---|---|---|---|
| 8 | 15 | 0 | 0.3 | 56 | 0.5 | 9.9 | 3.4 | 14 |
| 9 | 16 | 0.1 | 0.8 | 54 | 0.5 | 10.0 | 2.9 | 15 |
| 10 | 21 | 0 | 0.3 | 51 | 0.4 | 9.9 | 2.6 | 14 |
| 11 | 18 | 0.1 | 0.6 | 54 | 0.4 | 9.7 | 2.7 | 15 |
| 12 | 17 | 0.1 | 0.6 | 53 | 0.5 | 10.0 | 3.1 | 15 |
| 13 | 17 | 0 | 0.3 | 53 | 0.4 | 10.0 | 3.6 | 15 |
| 14 | 13 | 0 | 0.2 | 55 | 0.5 | 11.0 | 3.8 | 16 |
| 15 | 12 | 0.1 | 0.2 | 56 | 0.6 | 11.0 | 3.9 | 16 |

The time-profile plots obtained during SNMS testing of the samples pre-coated with polymer without the presence of barium ions in the initial solution (Samples 8–12) show relatively smooth carbon-sputtering curves, indicating that continuous polymer coatings were achieved. The continuity of the polymer coating determines, to a large extent, the continuity of the final, barium-containing coating. However, the SNMS plots for the same samples after exposure to the barium ions show that the continuity of the coating can be disrupted by the procedures, e.g., pH of the solution, used during exposure of the polymer-coated phosphor to barium ions. Further, as described above, the ESCA data show that bonding of the barium ions to even a continuous polymer coating is affected by the treatment given the samples to effect barium ion bonding.

Thus, the most preferred coating procedure is that described for Sample 9: exposure to the polymer solution at pH of at least 9, without the presence of the metal ions and no dispersant, then resuspension of the polymer-coated phosphor in a solution of metal ions, also at a pH of at least 9 to bond the metal ions to the polymer.

The invention described herein presents to the art a novel, improved phosphor and a phosphor coating method particularly useful for fluorescent lamp phosphors. The phosphor exhibits improved coating adherence, continuity, and conformality and improved lumen maintenance properties. The coating method is a reliable, cost effective chemical adsorption process for production of a coated phosphor exhibiting improved maintenance properties.

While there has been shown and described what are at present considered the preferred embodiments of the invention, it will be apparent to those skilled in the art that modifications and changes can be made therein without departing from the scope of the present invention as defined by the appended Claims.

We claim:

1. A method for providing an adherent, continuous, conformal, non-particulate coating of a compound of a metal or metalloid on the surface of individual phosphor particles, said method comprising:

wetting each of said individual particles with a polymer solution including a polymer in a solvent base, said polymer being capable of chelating ions of said metal or metalloid;

drying said particles to produce a continuous coating of said polymer on each of said individual particles; and suspending said polymer-coated phosphor particles in a solution containing ions of said metal or metalloid and having a pH of at least 9 to produce chelation of said metal or metalloid ions by said polymer coating, producing said adherent, continuous, conformal, non-particulate, metal- or metalloid-compound coating on said particle surfaces.

2. A method in accordance with claim 1 wherein the pH of said polymer solution is at least 9.

3. A method in accordance with claim 1 wherein said wetting of said phosphor particles comprises suspending said particles in said polymer solution.

4. A method in accordance with claim 1 wherein said phosphor is a calcium halophosphate, a barium disilicate, or a willemite phosphor.

5. A method in accordance with claim 1 wherein said polymer is a polyethylene oxide or a hydroxyethyl cellulose polymer.

6. A method in accordance with claim 1 wherein said metal or metalloid ions are ions of barium, lanthanum, strontium, magnesium, calcium, aluminum, yttrium, zinc, silicon or boron.

7. A method for improving lumen maintenance of a lamp comprising:

wetting individual particles of a phosphor powder with a polymer solution including a polymer in a solvent base said polymer being capable of chelating ions of a metal or metalloid;

drying said particles to produce a continuous coating of said polymer on each of said individual particles;

suspending said polymer-coated phosphor particles in a solution containing ions of said metal or metalloid and having a pH of at least 9 to produce chelation of said metal or metalloid ions by said polymer coating, producing said adherent, continuous, conformal, non-particulate, metal- or metalloid-compound coating on said particle surfaces;

suspending said metal- or metalloid-compound coated particle in a solution comprising a binder and an aqueous medium to form a phosphor suspension;

coating an interior surface of a lamp envelope with a layer of said phosphor suspension;

drying said phosphor layer sufficiently to adhere said phosphor layer to said lamp envelope surface; and lehring said lamp envelope to burn out said binder and said polymer and to produce a coating on said lamp envelope of phosphor particles, each particle having an adherent, continuous, conformal, non-particulate, metal- or metalloid-compound coating on its surface.

8. A method in accordance with claim 7 wherein the pH of said polymer solution is at least 9.

9. A method in accordance with claim 7 wherein said wetting of said phosphor particles comprises suspending said particles in said polymer solution.

10. A method in accordance with claim 7 wherein said phosphor is a calcium halophosphate, a barium disilicate, or a willemite phosphor.

11. A method in accordance with claim 7 wherein said polymer is a polyethylene oxide or a hydroxyethyl cellulose polymer.

12. A method in accordance with claim 7 wherein said metal or metalloid ions are ions of barium, lanthanum, strontium, magnesium, calcium, aluminum, yttrium, zinc, silicon or boron.

* * * * *